Aug. 21, 1923.
H. W. HANSON
TOP FOR TRACTORS
Filed Nov. 20, 1922
1,465,712
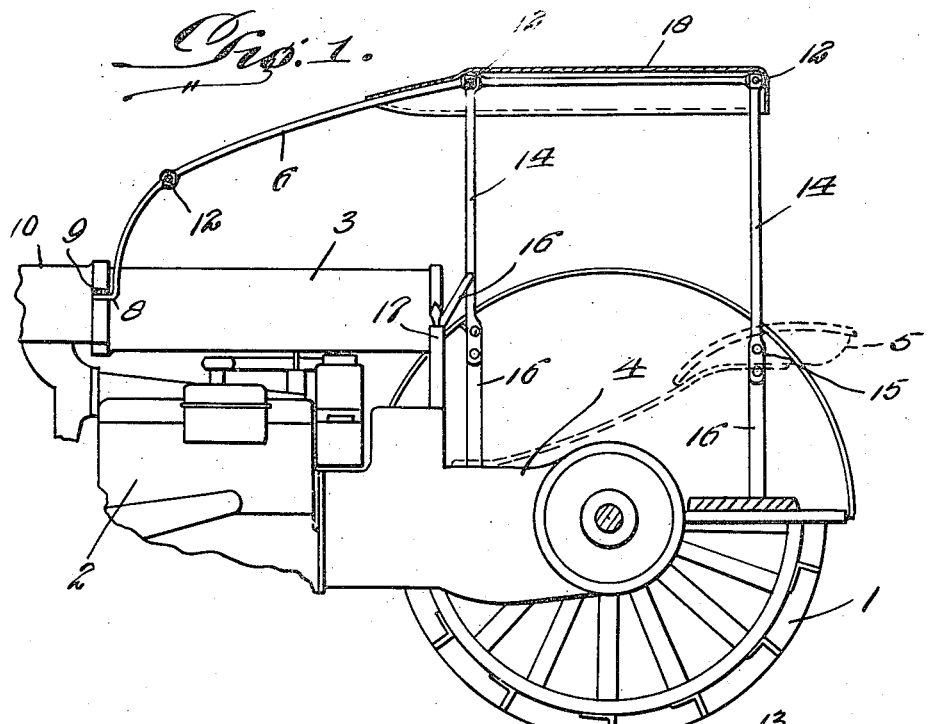
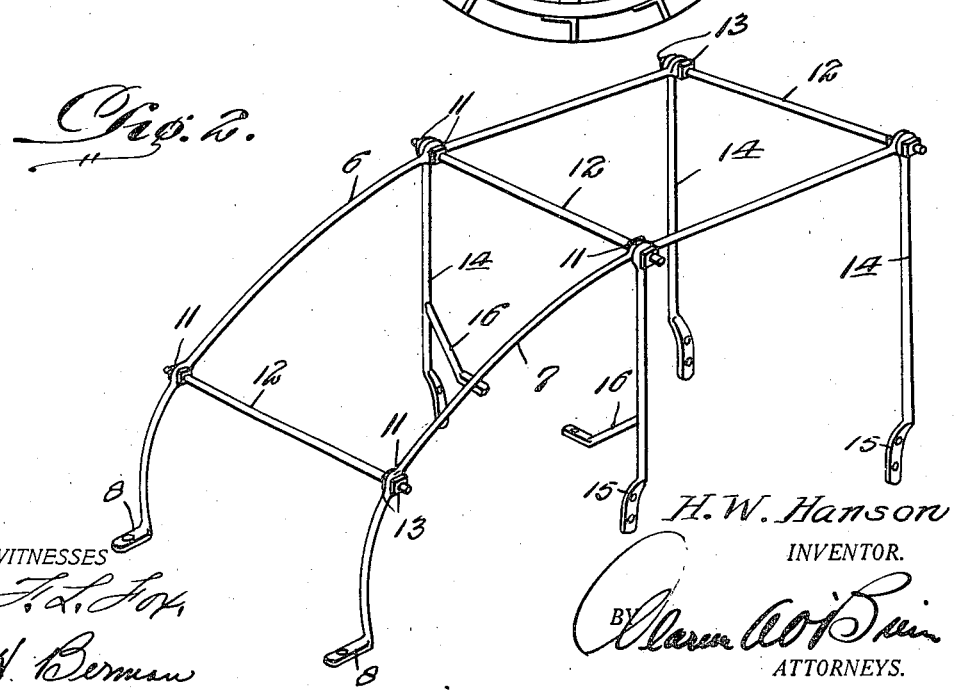
H. W. Hanson
INVENTOR.

Patented Aug. 21, 1923.

1,465,712

UNITED STATES PATENT OFFICE.

HENRY W. HANSON, OF CHENEY CENTER, COLORADO.

TOP FOR TRACTORS.

Application filed November 20, 1922. Serial No. 601,972.

*To all whom it may concern:*

Be it known that I, HENRY W. HANSON, a citizen of the United States, residing at Cheney Center, in the county of Prowers and State of Colorado, have invented certain new and useful Improvements in Tops for Tractors, of which the following is a specification.

This invention relates to improvements in tops for tractors and has for the primary object thereof such a device that is simple of construction, comparatively inexpensive of manufacture and highly useful of purpose.

A further object of the invention is the provision of such a device that may be conveniently attached to a conventional form of tractor for providing a sun shade and a rain protector for the driver of the tractor.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a fragmentary side elevational view of a conventional form of tractor having my improved top associated therewith, and Figure 2 is a perspective view of the frame work of the top, the cover therefor being removed.

Referring to the views, there is shown a conventional form of tractor having the usual driving wheels 1, motor 2, upper longitudinal gasoline tank 3, driver's platform 4, and spring seat 5.

The frame work of my top consists of spaced side rods 6 and 7 bent at their forward end portions so as to provide feet 8 for connecting as at 9 to the bolt members employed for connecting the front end of the gasoline tank 3 to the adjacent end of the water compartment 10 of the tractor. The rear ends of the side rods 6 and 7 extend substantially horizontally with respect to the horizontal plane of the tractor, and the forward ends of the rods are curved upon an arc as shown, whereby the above mentioned feet portions 8 of these rods engage with the hereinbefore mentioned connections 9.

Each of the side rods are flattened and eyed at predetermined points thereon as illustrated by the numeral 11 for receiving between these flattened and eyed portions strengthening cross bars 12, secured at their outer projecting ends to the side rods by nuts or the like 13. The front and rear ends of the horizontally extending portions of the side rods 6 and 7 have downwardly extending supporting arms 14 secured thereto at the upper ends thereof upon the said projecting ends of the strengthening bars 12. The lower ends of each of these vertical supports 14 are inwardly bent as at 15 for contacting with and to be secured to standards 16, formed upon the tractor. A front pair of supporting legs 14 preferably have formed thereon other inwardly projecting reinforcing legs 16, the ends of which are suitably formed as to engage upon the dash 17 of the tractor to be secured thereto.

Retained upon the rear portion of the side bars 6 and 7 in any suitable manner is a water-proof covering 18 for purposes readily apparent.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

What I claim as new is:—

1. A canopy or top for tractors comprising a pair of parallel spaced side bars having downwardly curved forward end portions with their free ends terminating in means adapted for rigid attachment to the tractor structure, said side bars being formed with alined transverse eyes at a plurality of spaced points, transverse bars having their ends projecting through said eyes, means upon opposite sides of the side bars and on the ends of the transverse bars for detachably connecting the side bars in rigid spaced relation, vertical supporting bars detachably mounted upon the ends of the transverse bars, and a covering upon the rear portions of the side bars.

2. A canopy top for tractors comprising a pair of parallel spaced side bars having downwardly curved forward end portions with their free ends terminating in means adapted for rigid attachment to the tractor structure, said side bars being formed with alined transverse eyes at a plurality of spaced points, transverse bars having their ends projecting through said eyes, means upon opposite sides of the side bars and on the ends of the transverse bars for detachably connecting the side bars in rigid spaced relation, vertical supporting bars detachably mounted upon the ends of the transverse bars, a covering upon the rear portions of the side bars, and means to attach the lower ends of the vertical supporting rods to the operator's platform and the dash of the tractor, respectively.

In testimony whereof I affix my signature.

HENRY W. HANSON.